(12) United States Patent
Hirose et al.

(10) Patent No.: US 10,707,482 B2
(45) Date of Patent: Jul. 7, 2020

(54) NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, METHOD FOR PRODUCING NEGATIVE ELECTRODE MATERIAL FOR NON-AQUEOUS SECONDARY BATTERY, AND METHOD FOR PRODUCING NON-AQUEOUS ELECTROLYTE SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP); Reiko Sakai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 276 days.

(21) Appl. No.: 15/763,973

(22) PCT Filed: Sep. 14, 2016

(86) PCT No.: PCT/JP2016/004170
§ 371 (c)(1),
(2) Date: Mar. 28, 2018

(87) PCT Pub. No.: WO2017/061073
PCT Pub. Date: Apr. 13, 2017

(65) Prior Publication Data
US 2018/0261833 A1 Sep. 13, 2018

(30) Foreign Application Priority Data
Oct. 8, 2015 (JP) .................. 2015-200037

(51) Int. Cl.
*H01M 4/13* (2010.01)
*H01M 4/36* (2006.01)
(Continued)

(52) U.S. Cl.
CPC .............. *H01M 4/366* (2013.01); *C01B 32/05* (2017.08); *C01B 33/325* (2013.01); *H01M 4/36* (2013.01);
(Continued)

(58) Field of Classification Search
CPC .......... H01M 4/366; H01M 4/36; H01M 4/48; H01M 4/5825; H01M 4/625; H01M 4/628;
(Continued)

(56) References Cited

U.S. PATENT DOCUMENTS 5,395,711 A 3/1995 Tahara et al.
7,459,236 B2 12/2008 Konishiike et al.
(Continued)

FOREIGN PATENT DOCUMENTS

JP 2997741 B2 1/2000
JP 2001-185127 A 7/2001
(Continued)

OTHER PUBLICATIONS

Mar. 8, 2019 Search Report issued in European Patent Application No. 16853232.3.
(Continued)

*Primary Examiner* — Raymond Alejandro
(74) *Attorney, Agent, or Firm* — Oliff PLC

(57) ABSTRACT

A negative electrode active material for non-aqueous electrolyte secondary batteries which has particles of negative electrode active material, the particles of negative electrode active material containing a silicon compound ($SiO_x$: $0.5 \leq x \leq 1.6$) that contains a Li compound, including a carbon
(Continued)

coating on at least a part of a surface of the silicon compound and a salt coating containing one or more kinds of a metal silicate containing a metal element other than a lithium element and a metal salt containing a metal element other than the lithium element on a part of a surface of the silicon compound or a surface of the carbon coating or both of these. Thus, the negative electrode active material for non-aqueous electrolyte secondary batteries having high stability to an aqueous slurry, high capacity and excellent cycle characteristics and initial efficiency may be provided.

16 Claims, 2 Drawing Sheets

(51) Int. Cl.

| | | |
|---|---|---|
| *H01M 4/48* | (2010.01) | |
| *C01B 32/05* | (2017.01) | |
| *C01B 33/32* | (2006.01) | |
| *H01M 4/58* | (2010.01) | |
| *H01M 4/62* | (2006.01) | |
| *H01M 10/0525* | (2010.01) | |
| *C01B 33/113* | (2006.01) | |
| *H01M 4/02* | (2006.01) | |

(52) U.S. Cl.
CPC ........... *H01M 4/48* (2013.01); *H01M 4/5825* (2013.01); *H01M 4/625* (2013.01); *H01M 4/628* (2013.01); *H01M 10/0525* (2013.01); *C01B 33/113* (2013.01); *C01P 2004/80* (2013.01); *C01P 2006/40* (2013.01); *H01M 2004/027* (2013.01); *H01M 2220/30* (2013.01)

(58) Field of Classification Search
CPC ........... H01M 10/052; H01M 10/0525; H01M 2004/027; H01M 2220/30; C01B 32/05; C01B 33/325; C01B 33/113; C01P 2004/80; C01P 2006/40
See application file for complete search history.

(56) References Cited

U.S. PATENT DOCUMENTS

| | | | |
|---|---|---|---|
| 8,377,592 | B2 | 2/2013 | Jeong et al. |
| 10,388,467 | B2* | 8/2019 | Kuriki .................... H01G 11/42 |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2011/0097627 | A1 | 4/2011 | Watanabe et al. |
| 2011/0244334 | A1* | 10/2011 | Kawada .................. C23C 16/26 |
| | | | 429/231.8 |
| 2013/0224600 | A1* | 8/2013 | Yasuda .................. H01G 11/50 |
| | | | 429/231.8 |
| 2015/0228965 | A1 | 8/2015 | Ushiroda et al. |
| 2016/0254525 | A1 | 9/2016 | Hirose et al. |
| 2016/0336592 | A1 | 11/2016 | Hirose et al. |

FOREIGN PATENT DOCUMENTS

| | | |
|---|---|---|
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2010-092830 A | 4/2010 |
| JP | 2011-096455 A | 5/2011 |
| JP | 2015-111547 A | 6/2015 |
| JP | 2015-165482 A | 9/2015 |

OTHER PUBLICATIONS

Nov. 28, 2019 Office Action issued in Taiwanese Patent Application No. 105130718.
Oct. 18, 2016 International Search Report issued in International Patent Application No. PCT/JP2016/004170.

* cited by examiner

[FIG. 1]
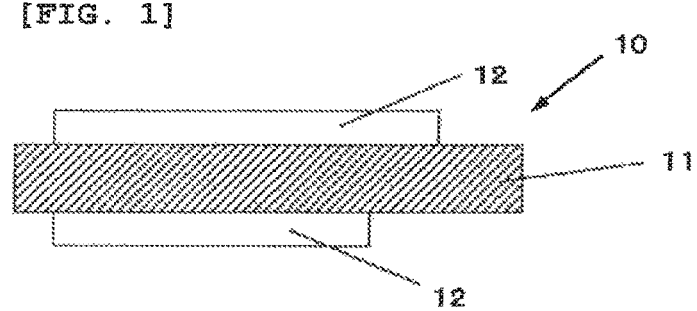
[FIG. 2]
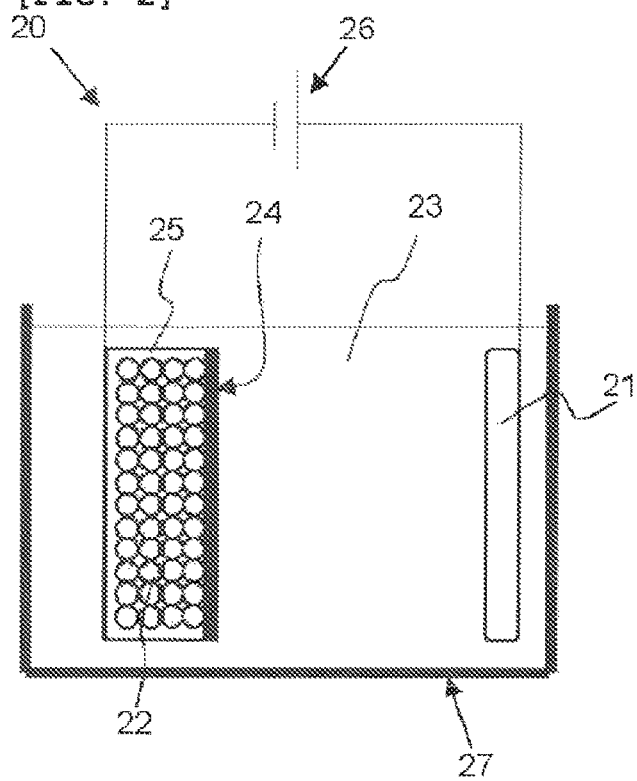
[FIG. 3]
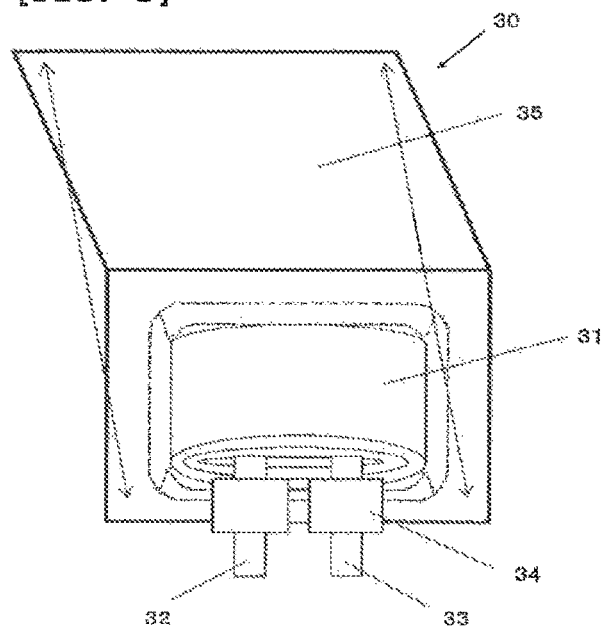

[FIG. 4]
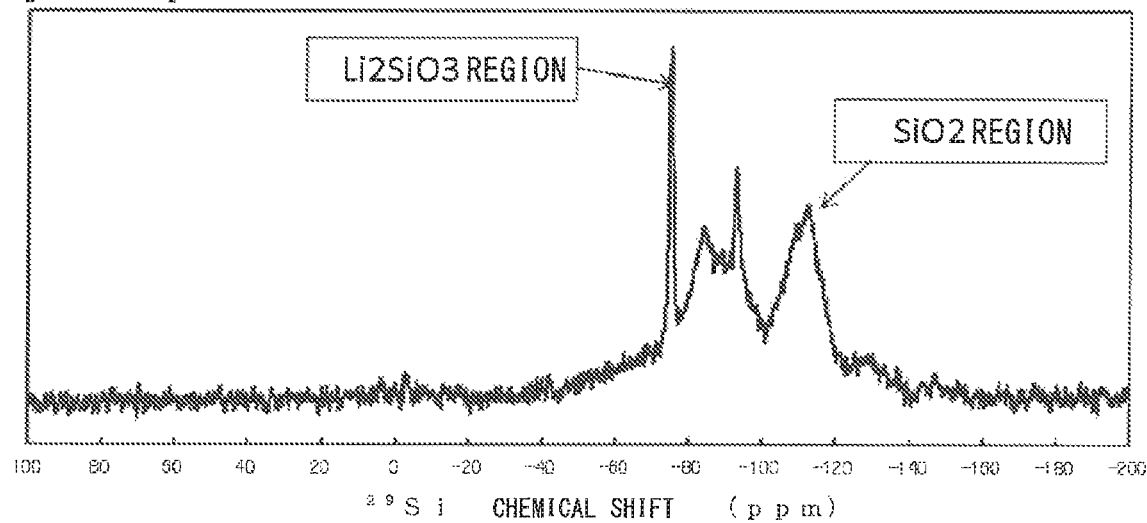
[FIG. 5]
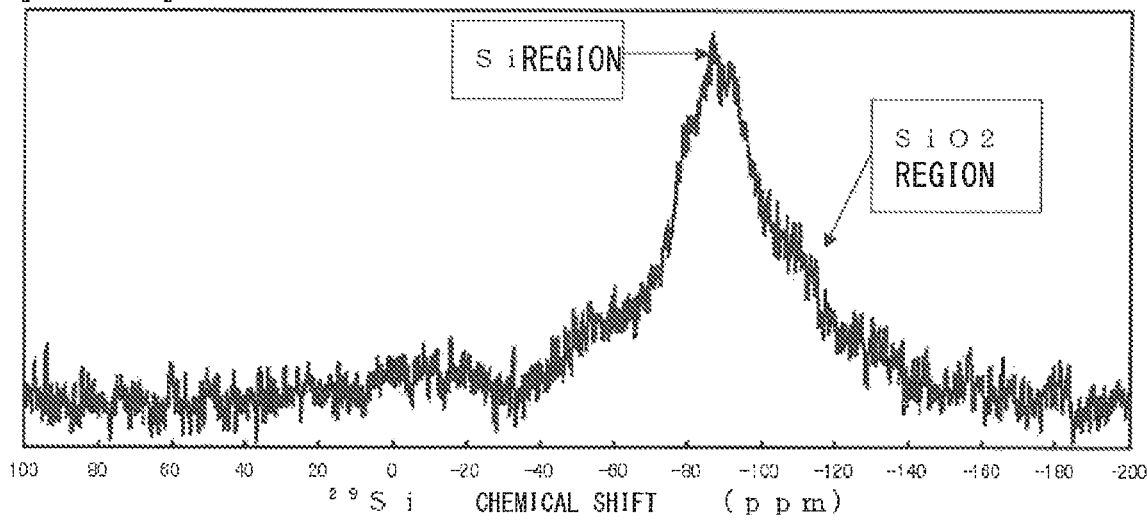

NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, METHOD FOR PRODUCING NEGATIVE ELECTRODE MATERIAL FOR NON-AQUEOUS SECONDARY BATTERY, AND METHOD FOR PRODUCING NON-AQUEOUS ELECTROLYTE SECONDARY BATTERY

TECHNICAL FIELD

The present invention relates to a negative electrode active material for non-aqueous electrolyte secondary batteries, a non-aqueous electrolyte secondary battery, a method for producing a negative electrode material for non-aqueous electrolyte secondary batteries, and a method for producing non-aqueous electrolyte secondary batteries.

BACKGROUND ART

In recent years, small-sized electronic devices represented by mobile terminals and the like have been widely spread and further down-sizing, lighter weight and longer life are strongly demanded. To a market demand like this, secondary batteries capable of obtaining, in particular, a smaller size, a lighter weight and a higher energy density have been developed. The secondary batteries are studied to apply also to, without limiting to small-sized electronic devices, large-sized electronic devices represented by automobiles and power-storage systems represented by houses or the like.

Among these, a lithium ion secondary battery is highly expected because it may readily obtain a smaller size and higher capacity and may obtain the energy density higher than that of a lead battery or a nickel-cadmium battery.

The lithium ion secondary battery includes an electrolytic solution together with a positive electrode and a negative electrode, and a separator, and the negative electrode includes a negative electrode active material involving a charge/discharge reaction.

As the negative electrode active material, while a carbon material is widely used, a further improvement in the battery capacity is demanded from recent market demand. In order to improve the battery capacity, it has been studied to use silicon as the negative electrode active material. This is because a great improvement of the battery capacity may be expected since silicon has a theoretical capacity (4199 mAh/g) no smaller than 10 times the theoretical capacity (372 mAh/g) of graphite. A development of a silicon material as the negative electrode active material includes studies on not only a silicon simple substance but also compounds represented by alloys, oxides or the like. Further, shapes of the active material have been studied, from a coating type, which is standard for the carbon material, to an integrated type directly deposited on a current collector.

However, when, as the negative electrode active material, the silicon is used as a main raw material, since the negative electrode active material expands and contracts during charging/discharging, mainly in the neighborhood of a superficial layer of the negative electrode active material, crack tends to occur. Further, an ionic substance is generated inside of the active material, the negative electrode active material tends to crack. When a superficial layer of the negative electrode active material is broken, a new surface is generated thereby, and a reaction area of the active material increases. At this time, since a decomposition reaction of an electrolytic solution occurs on the new surface and a coating that is decomposition product of the electrolytic solution is formed on the new surface, the electrolytic solution is consumed. Therefore, cycle characteristics tends to be degraded.

Until now, in order to improve a battery initial efficiency and the cycle characteristics, negative electrode materials for lithium ion secondary batteries having the silicon material as a main material and electrode configurations have been variously studied.

Specifically, in order to obtain excellent cycle characteristics and high safety, silicon and amorphous silicon dioxide are simultaneously deposited by using a gas phase method (see, for example, Patent Document 1). Further, in order to obtain high battery capacity and safety, a carbon material (an electron conductor) is provided on a superficial layer of particles of silicon oxide (see, for example, Patent Document 2). Further, in order to improve the cycle characteristics and to obtain high input/output characteristics, an active material containing silicon and oxygen is prepared and an active material layer having a high oxygen ratio in the neighborhood of a current collector is formed (see, for example, Patent Document 3). Still further, in order to improve the cycle characteristics, oxygen is contained in a silicon active material such that an average oxygen content is not higher than 40 at. %, and an oxygen content is high in a position close to a current collector (see, for example, Patent Document 4).

Further, in order to improve an initial charge/discharge efficiency, a nano composite containing a Si phase, $SiO_2$ and a $M_yO$ metal oxide is used (see, for example, Patent Document 5). Still further, in order to improve the cycle characteristics, $SiO_x$ ($0.8 \leq x \leq 1.5$, particle size range=1 μm to 50 μm) and a carbon material are mixed and sintered at a high temperature (see, for example, Patent Document 6). Further, in order to improve the cycle characteristics, a mol ratio of oxygen to silicon in a negative active material is set to 0.1 to 1.2, and an active material is controlled in the range such that a difference of a maximum value and a minimum value of the mol ratio in the neighborhood of an interface of the active material and a current collector is not larger than 0.4 (see, for example, Patent Document 7). Still further, in order to improve battery load characteristics, a metal oxide containing lithium is used (see, for example, Patent Document 8). Further, in order to improve the cycle characteristics, a hydrophobic layer such as a silane compound is formed on a superficial layer of a silicon material (see, for example, Patent Document 9).

Still further, in order to improve the cycle characteristics, a silicon oxide is used, and a graphite coating is formed on a superficial layer thereof to impart conductivity (see, for example, Patent Document 10). In the Patent Document 10, regarding a shift value obtained from a Raman spectrum of the graphite coating, broad peaks appear at 1330 $cm^{-1}$ and 1580 $cm^{-1}$, and an intensity ratio thereof $I_{1330}/I_{1580}$ is $1.5 < I_{1330}/I_{1580} < 3$. Further, in order to improve high battery capacity and cycle characteristics, particles having a silicon crystallite phase dispersed in a silicon dioxide are used (see, for example, Patent Document 11). Still further, in order to improve overcharge and overdischarge characteristics, a silicon oxide in which atomic ratios of silicon and oxygen are controlled to 1:y ($0<y<2$) is used (see, for example, Patent Document 12). Further, in order to improve high battery capacity and cycle characteristics, a mixed electrode of silicon and carbon is prepared and a silicon ratio is designed to be not lower than 5 wt % and not higher than 13 wt % (see, for example, Patent Document 13).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741
Patent Document 13: Japanese Unexamined Patent publication (Kokai) No. 2010-092830

SUMMARY OF INVENTION

Technical Problem

As was described above, in recent years, higher performance and multi-functionalization of small-sized electronic devices typical in the mobile terminals have been proceeded, a lithium ion secondary battery a main power source of which is required to increase the battery capacity. As one measure to solve the problem, it is desired to develop a lithium ion secondary battery formed of a negative electrode that uses a silicon material as a main material.

Further, the lithium ion secondary battery that uses the silicon material is desired to have battery characteristics close to that of the lithium ion secondary battery that uses a carbon material. Accordingly, by using the silicon oxide modified by insertion and partial desorption of Li as a negative electrode active material, a cycle retention rate and an initial efficiency of the battery have been improved. However, due to modification with Li, the silicon oxide after modification has relatively low water resistance. Therefore, there was a case such that stabilization of a slurry containing the silicon oxide after modification which is prepared during production of the negative electrode becomes insufficient to result in gas generation due to temporal change of the slurry, or the particles of silicon oxide and a binder component coagulate to generate sedimentation (precipitation). Therefore, there was a case that an apparatus conventionally and generally used for applying a carbon-based active material may not be used, or is difficult to use. Thus, when the silicon oxide the initial efficiency and cycle retention rate of which have been improved by the modification by the use of Li is used, the stability of the slurry containing water becomes insufficient. Therefore, a negative electrode active material for non-aqueous electrolyte secondary batteries advantageous in an industrial production of secondary batteries has not been proposed.

The present invention was performed in view of the problems such as described above and intends to provide a negative electrode material that has high stability to an aqueous slurry, a high capacity, and excellent cycle characteristics and initial efficiency.

Further, the present invention intends to provide a method for producing a negative electrode material that has high stability to the aqueous slurry, a high capacity, and excellent cycle characteristics and initial efficiency.

Solution to Problem

In order to achieve the object, the present invention provides a negative electrode active material for non-aqueous electrolyte secondary batteries having particles of negative electrode active material, the particles of negative electrode active material containing a silicon compound ($SiO_x$: $0.5 \leq x \leq 1.6$) in which a Li compound is contained, including: a carbon coating on at least a part of a surface of the silicon compound; and a salt coating containing one or more kinds of a metal silicate containing a metal element other than a lithium element and a metal salt containing a metal element other than the lithium element on a part of a surface of the silicon compound or a surface of the carbon coating or both of these.

The negative electrode active material of the present invention has high water resistance, because the particles of negative electrode active material containing the silicon compound (hereinafter, referred to also as particles of silicon-based active material) have, on the outermost surface thereof, the salt coating containing one or more kinds of a metal silicate containing a metal element other than the lithium element and a metal salt containing a metal element other than the lithium element. Thus, the stability of an aqueous slurry in which the negative electrode active material prepared during production of the negative electrode is mixed is improved, and generation of gas and sedimentation may be suppressed. Further, according to the present invention, the electric conductivity becomes excellent because at least a part of a surface of the silicon compound is covered with the carbon coating. Therefore, when the negative electrode active material of the present invention is used, non-aqueous electrolyte secondary batteries having high battery capacity and high cycle retention rate obtained by utilizing characteristics intrinsic to the silicon oxide modified with Li may be advantageously produced in an industrial production.

At this time, the metal silicate preferably contains one or more kinds of elements of aluminum and magnesium.

Thus, when the metal silicate contains the metal element such as described above, the aqueous slurry in which the negative electrode active material of the present invention is mixed is more stabilized.

Further, at this time, the metal salt preferably contains at least one or more kinds of elements of aluminum and magnesium.

Thus, when the metal salt contains the metal element such as described above, the aqueous slurry in which the negative electrode active material of the present invention is mixed may be more stabilized.

At this time, it is more preferable that the metal salt further contains the lithium element.

Thus, the metal salt may further contain the lithium element in addition to the metal element other than the lithium element. Even in this case, the aqueous slurry in which the negative electrode active material of the present invention is mixed may be stabilized.

Further, at this time, the metal salt is preferably a compound selected from a hydrochloride, a perchlorate, a nitrate, and an acetate.

When the metal salt is a salt such as described above, the aqueous slurry may be brought closer to neutrality. Therefore, the aqueous slurry in which the negative electrode active material of the present invention is mixed may be more stabilized.

At this time, it is preferable for the salt coating further contains a metal oxide.

When the salt coating contains the metal oxide in addition to the metal silicate and/or metal salt, the water resistance of the negative electrode active material is more improved.

Further, at this time, the particles of negative electrode active material preferably have an atomic ratio of C calculated from a peak of C1s and an atomic ratio of O calculated from a peak of O1s larger than atomic ratios of elements other than these in atomic ratios calculated from peaks appeared in a spectrum in the range of a binding energy of from 0 eV to 1300 eV measured by a survey scanning of X-ray photoelectron spectrometry.

The particles of silicon-based active material like this are coated well balanced with the carbon coating and salt coating. Therefore, due to a high-quality coating made of the carbon coating and the salt coating, both of high electric conductivity and high water resistance are provided.

At this time, a mass of the salt coating is preferably at the rate of not larger than 2.0% by mass to a mass of the particles of negative electrode active material.

When the rate is not higher than 2.0% by mass, there is no fear of the salt coating of preventing an exchange of lithium, and an increase of resistance of the negative electrode may be suppressed.

Further, at this time, the silicon compound is preferable to contain one or more kinds of $Li_2SiO_3$ or $Li_4SiO_4$ as the Li compound.

Since the Li silicates like $Li_2SiO_3$ and $Li_4SiO_4$ are relatively stable as the Li compound, more excellent battery characteristics may be obtained.

At this time, it is preferable for the silicon compound to satisfy, as a chemical shift value obtained from a $^{29}Si$-MAS-NMR spectrum, a relationship of A>B between a maximum intensity A among peaks derived from Si or $Li_2SiO_3$ provided between −60 to −94 ppm and an intensity B of a peak derived from a $SiO_2$ region provided between −95 to −150 ppm.

Thus, in the silicon compound, when an amount of a silicon component or $Li_2SiO_3$ is larger on the basis of a $SiO_2$ component, the negative electrode active material capable of sufficiently obtaining an improvement effect of the battery characteristics due to insertion of Li is obtained.

Further, at this time, when a test cell formed of a negative electrode prepared by using a negative electrode active material obtained by mixing the negative electrode active material for non-aqueous electrolyte secondary batteries and a carbon-based active material and a counter electrode lithium is charged/discharged, and a graph showing a relationship between a differential value dQ/dV obtained by differentiating a discharge capacity Q by a potential V of the negative electrode based on the counter electrode lithium and the potential V is depicted, the potential V of the negative electrode during discharge of flowing a current such that the negative electrode active material for the non-aqueous electrolyte secondary battery desorbs lithium preferably has a peak in the range of from 0.40 V to 0.55 V.

Since the peak in the V-dQ/dV curve is similar to the peak of the silicon material and has a sharp rise of a discharge curve on a higher potential side, when a battery is designed, a capacity is readily developed.

At this time, the silicon compound preferably has a half-value width (2θ) of a diffraction peak due to a Si(111) crystal plane obtained by X-ray diffractometry of not smaller than 1.0° and a crystallite size due to the crystal plane of not larger than 8.6 nm.

Since the silicon-based active material having the half-value width and crystallite size like this has low crystallinity and a low abundance of Si crystallites, the battery characteristics may be improved.

Further, at this time, a median diameter of the silicon compound is preferably not smaller than 0.5 μm and not larger than 15 μm.

When the median diameter is not smaller than 0.5 μm, without consuming extra Li, the cycle retention rate of the battery may be maintained high, since an area (an area per unit mass of the silicon compound) where a side reaction occurs on a surface of the silicon compound is small. Further, when the median diameter is not larger than 15 μm, expansion during insertion of Li is small, the crack is difficult to occur, and, fissure is difficult to occur. Further, due to small expansion of the silicon compound, a negative electrode active material layer is difficult to be destroyed during charging/discharging.

Further, in order to achieve the object, the present invention provides a non-aqueous electrolyte secondary battery containing any one of the negative electrode active materials for non-aqueous electrolyte secondary batteries.

The secondary battery like this has high cycle retention rate and initial efficiency and may be industrially advantageously produced.

Further, in order to achieve the object, the present invention provides a method for producing a negative electrode material for non-aqueous electrolyte secondary batteries containing particles of negative electrode active material including the steps of: preparing particles of silicon oxide represented by a general formula $SiO_x$ (0.5≤x≤1.6); forming a carbon coating on at least a part of a surface of the particles of silicon oxide; inserting Li in the particles of silicon oxide covered with the carbon coating to modify the particles of silicon oxide; and forming a salt coating containing one or more kinds of a metal silicate containing a metal element other than a lithium element and a metal salt containing a metal element other than the lithium element on at least a part of a surface of the particles of silicon oxide after modification or a surface of the carbon coating or both of these, the particles of silicon oxide on which the salt coating has been formed are used to produce the negative electrode material for non-aqueous electrolyte secondary battery.

According to the method for producing the negative electrode material for non-aqueous electrolyte secondary batteries like this, a negative electrode material having high battery capacity and excellent cycle retention rate obtained by utilizing characteristics intrinsic to the silicon oxide modified by using Li may be obtained. Further, since the negative electrode material produced thus contains the particles of silicon-based active material having the salt coating as described above, the slurry prepared during production of the negative electrode becomes stable. That is, the negative electrode material capable of industrially and advantageously producing the secondary batteries may be obtained.

Further, in order to achieve the object, the present invention provides a method for producing the non-aqueous electrolyte secondary batteries wherein a negative electrode material for non-aqueous electrolyte secondary batteries is produced according to the production method described above, and a non-aqueous electrolyte secondary battery is produced by using the negative electrode material for non-aqueous electrolyte secondary batteries.

According to the method for producing the secondary batteries like this, high cycle retention rate and initial efficiency are provided, and the secondary batteries may be industrially and advantageously produced.

Advantageous Effects of Invention

The negative electrode active material of the present invention may improve the stability of the slurry prepared during production of secondary batteries, and, when the slurry is used, an industrially usable coated film may be formed. Therefore, substantially, the battery capacity, the cycle characteristics, and the initial charge/discharge characteristics may be improved. Further, the secondary batteries of the present invention containing the negative electrode active material may be industrially advantageously produced, and the battery capacity, the cycle characteristics, and the initial charge/discharge characteristics become excellent. Further, also in electronic devices, electric tools, electric vehicles and electric storage systems that use the secondary battery of the present invention, identical effects may be obtained.

Further, the method for producing the negative electrode of the present invention may produce the negative electrode material that may improve the stability of the slurry prepared during production of the secondary battery, and, may improve the battery capacity, the cycle characteristics, and the initial charge/discharge characteristics. Thus, the negative electrode material that may produce industrially advantageously the secondary batteries having excellent battery characteristics may be readily obtained.

BRIEF DESCRIPTION OF THE DRAWINGS

FIG. 1 shows a cross-sectional view showing a configuration of a negative electrode containing a negative electrode active material of the present invention;

FIG. 2 shows a bulk interior modifier capable of using when producing the negative electrode active material of the present invention;

FIG. 3 is an exploded view showing a configurational example (laminate film type) of a lithium ion secondary battery containing the negative electrode active material of the present invention;

FIG. 4 is a $^{29}$Si-MAS-NMR spectrum measured from a silicon compound in Example 1-3; and FIG. 5 is a $^{29}$Si-MAS-NMR spectrum measured from the silicon compound in Example 3-3.

DESCRIPTION OF EMBODIMENTS

In what follows, an embodiment of the present invention will be described. However, the present invention is not limited thereto.

As was described above, as one of methods for increasing the battery capacity of the lithium ion secondary batteries, it has been studied to use the negative electrode that uses the silicon-based active material as a main material as the negative electrode of the lithium ion secondary battery. The lithium ion secondary battery that uses the silicon-based active material as the main material is desired to have the cycle characteristics and the initial efficiency close to those of the lithium ion secondary battery that uses the carbon material. However, the silicon-based active material modified with Li to obtain the cycle characteristics and the initial efficiency close to those of the lithium ion secondary battery that uses the carbon material is difficult to prepare a stable slurry. In the unstable slurry like this, there was a problem that it is difficult to produce a high-quality negative electrode because gas generation occurs or sedimentation is caused in a relatively early stage after the production of the slurry.

Therefore, the present inventors have conducted intensive studies to obtain a negative electrode active material that has high battery capacity and may readily produce a non-aqueous electrolyte secondary battery having excellent cycle characteristics and initial efficiency and came to complete the present invention.

A negative electrode active material of the present invention contains particles of silicon-based active material having a silicon compound ($SiO_x$: $0.5 \leq x \leq 1.6$) in which a Li compound is contained. Further, the negative electrode active material is provided with a carbon coating formed on at least a part of a surface of the silicon compound. Further, at least a part of a surface of the silicon compound or a surface of the carbon coating, or both of these is provided with a salt coating containing at least one or more kinds of a metal silicate containing a metal element other than a lithium element and a metal salt containing a metal element other than the lithium element.

In the negative electrode active material like this, the particles of silicon-based active material have a coating layer made of at least one kind of a metal silicate and a metal salt on the outermost surface thereof. Therefore, high water resistance to an aqueous slurry may be obtained. So far, an aqueous slurry containing the silicon compound such as the silicon oxide modified by insertion or desorption of Li temporally changes to cause gas generation, sedimentation at the early stage. Therefore, it was inaptitude to use for mass production of the secondary batteries.

However, according to the present invention, the particles of silicon-based active material have improved water resistance due to the salt coating such as described above and become difficult to cause gas generation and sedimentation accompanying the temporal change of the slurry. Therefore, when the slurry is applied on, for example, a current collector or the like, a stable coated film may be obtained to result in improving binding property. Further, a cation side of the stabilized metal silicate is likely to react with a carboxyl group of carboxymethyl cellulose (CMC) generally used as a binder to further improve the binding property.

Further, the present invention has excellent electric conductivity because at least a part of a surface of the silicon compound is covered with the carbon coating. From what was described above, when the negative electrode active material of the present invention is used, the non-aqueous electrolyte secondary batteries having high battery capacity and excellent cycle retention rate that utilize the characteristics intrinsic to the silicon oxide modified with Li may be produced advantageously in an industrial production.

1. Method for Producing Negative Electrode Active Material
(Configuration of Negative Electrode)

Subsequently, a configuration of the negative electrode of the secondary battery containing the negative electrode active material of the present invention like this will be described.

FIG. 1 shows a cross-sectional view of the negative electrode containing the negative electrode active material of the present invention. As shown in FIG. 1, a negative electrode 10 is configured to have a negative electrode active material layer 12 on a negative electrode current collector 11. The negative electrode active material layer 12 may be provided on both sides, or, only on one side of the negative electrode current collector 11. Further, in the negative electrode of the non-aqueous electrolyte secondary battery of the present invention, the negative electrode current collector 11 may not be provided.

(Negative Electrode Current Collector)

The negative electrode current collector 11 is configured from a material that is an excellent electric conductor and has strong mechanical strength. As an electric conductive material that may be used in the negative electrode current collector 11, for example, copper (Cu) or nickel (Ni) may be used. The conductive material is preferably a material that does not form an intermetallic compound with lithium (Li).

The negative electrode current collector 11 preferably contains carbon (C) or sulfur (S) other than the main element. This is because physical strength of the negative electrode current collector is improved. In particular, this is because, in the case of having an active material layer that expands during charging, when the current collector contains the element, there is an effect of suppressing deformation of the electrode including the current collector. A content of the contained element is not particularly limited but, in particular, is preferably not larger than 100 ppm. This is because higher deformation suppression effect may be obtained.

A surface of the negative electrode current collector 11 may be roughened or may not be roughened. Examples of the roughened negative electrode current collector include metal foils subjected to, for example, an electrolytic treatment, an embossing treatment, or a chemical etching treatment. Examples of the negative electrode current collector that is not roughened include, for example, a rolled metal foil or the like.

(Negative Electrode Active Material Layer)

The negative electrode active material layer 12 may contain a plurality of kinds of negative electrode active materials such as the carbon-based active material other than the particles of silicon-based active material. Further, from the viewpoint of the battery design, other materials such as a thickener (referred to also as "binding material", "binder"), a conductive assistant or the like may be contained. Still further, a shape of the negative electrode active material may be particle-like.

As was described above, the negative electrode active material of the present invention contains the particles of silicon-based active material made of $SiO_x$ (0.5≤x≤1.6). The particles of silicon-based active material are made of a silicon oxide material ($SiO_x$: 0.5≤x≤1.6) and a composition thereof preferably has x closer to 1. This is because high cycle characteristics may be obtained. It is to be noted that the composition of the silicon oxide material in the present invention does not necessarily mean purity of 100% but may contain a slight amount of impurity element or Li.

Further, in the present invention, the lower the crystallinity of the silicon compound is, the better. Specifically, it is desirable that a half-value width (2θ) of a diffraction peak due to a Si (111) crystal plane obtained by an X-ray diffraction of the silicon-based active material is not smaller than 1.0° and a crystallite size due to the crystal plane is not larger than 8.6 nm. Thus, due to, in particular, low crystallinity and small abundance of the Si crystallites, not only the battery characteristics are improved but also a stable Li compound may be generated.

Further, a median diameter of the silicon compound is not particularly limited but is particularly preferable to be not smaller than 0.5 μm and not larger than 15 μm. This is because, in the range, the lithium ions are readily absorbed/released during charging/discharging, and the particles of silicon-based active material become difficult to be broken. When the median diameter is not smaller than 0.5 μm, since a surface area is not too large, a side reaction is difficult to occur during charging/discharging, and battery irreversible capacity may be reduced. On the other hand, when the median diameter is not larger than 15 μm, the particles of silicon-based active material are difficult to be broken and a newly generated surface is preferably difficult to be generated. Further, for example, a negative electrode active material layer in which the carbon active material is mixed with the generally used silicon-based active material is difficult to be broken during charging.

Further, according to the present invention, in the silicon-based active material, $Li_2SiO_3$ and $Li_4SiO_4$ are preferably present as the Li compounds contained in the silicon compound. Since the Li silicate is relatively more stable than other Li compounds, the silicon-based active material containing these Li compounds may obtain more stable battery characteristics. These Li compounds may be obtained by modifying the silicon compound by selectively changing a part of a $SiO_2$ component generated inside of the silicon compound to the Li compound.

The Li compound inside of the silicon compound may be measured by NMR (nuclear magnetic resonance) and XPS (X-ray photoelectron spectroscopy). Measurements of XPS and NMR may be conducted under, for example, the following conditions.

XPS
  Device: X-ray photoelectron spectrometer,
  X-ray source: monochromatic Al—K alpha line,
  X-ray spot diameter: 100 μm,
  Ar ion gun sputtering condition: 0.5 kV 2 mm×2 mm.
$^{29}$Si MAS NMR (magic angle rotation nuclear magnetic resonance)
  Device: 700 NMR spectrometer produced by Bruker Inc.,
  Probe: 4 mm HR-MAS Rotor 50 μL,
  Sample revolving speed: 10 kHz, and
  Measurement environment temperature: 25°.

Further, in the present invention, when modifying the silicon compound, methods such as an electrochemical method, modification due to a redox reaction, and thermal doping that is a physical method may be used. In particular, when the silicon compound was modified by using modification due to the electrochemical method and a redox reaction, the battery characteristics of the negative electrode active material are improved. Further, when modifying, not only the insertion of Li into the silicon compound but also desorption of Li from the silicon compound may be preferably applied in combination. Thus, the stability to the slurry such as the water resistance of the negative electrode active material or the like may be further improved.

Further, in the negative electrode active material of the present invention, the silicon compound is preferable to satisfy, as a chemical shift value obtained from a $^{29}$Si-MAS-NMR spectrum, a relationship of A>B between a maximum intensity A among peaks derived from Si or $Li_2SiO_3$ provided between −60 to −94 ppm and an intensity B of a peak derived from a $SiO_2$ region provided between −95 to −150 ppm. In the silicon compound, when an amount of a silicon component or $Li_2SiO_3$ is relatively larger on the basis of a $SiO_2$ component, an improvement effect of the battery characteristics due to the insertion of Li may be sufficiently obtained. When doping lithium to the silicon compound according to, in particular, the electrochemical method, it is desirable that the silicon component is more abundant relative to the $SiO_2$ component, and when doping the lithium to the silicon compound according to the thermal doping, it is desirable that the Li silicate component is more abundant than the $SiO_2$ component.

Further, as was described above, the particles of silicon-based active material are provided with the salt coating containing at least one or more kinds of a metal silicate containing a metal element other than the lithium element and a metal salt containing a metal element other than the lithium element on at least a part of the surface of the silicon compound or the surface of the carbon coating or both of these.

The metal silicate contained in the salt coating preferably contains at least one or more kinds of elements among aluminum and magnesium. When the metal silicate contains metal elements like these, the aqueous slurry in which the negative electrode active material of the present invention was mixed may be more stabilized.

Further, the metal salt contained in the salt coating preferably contains one or more kinds of elements among aluminum and magnesium. When the metal salt contains the metal elements like these, the aqueous slurry in which the negative electrode active material of the present invention was mixed may be more stabilized.

Still further, the metal salt may preferably further contain the lithium element. The metal salt may further contain the lithium element in addition to the metal elements other than the lithium element. Also in this case, the aqueous slurry in which the negative electrode active material of the present invention was mixed may be stabilized.

Further, the metal salt is preferably a compound selected from a hydrochloride, a perchlorate, a nitrate, and an acetate. When the particles of silicon-based active material containing the silicon compound in which the lithium was inserted are dispersed in the aqueous slurry, pH of the aqueous slurry tends to incline to the basic side to be likely to be unstable. As long as the metal salt contained in the salt coating is the salt like this, the aqueous slurry in which the negative electrode active material of the present invention was mixed may be more stabilized, because the pH of the aqueous slurry may be brought closer to a neutral side.

Further, the salt coating preferably further contains a metal oxide. When the salt coating contains the metal oxide in addition to the metal silicate and metal salt, the water resistance of the negative electrode active material is more improved.

By the way, the "metal salt" in the present specification is a concept that does not contain the metal oxide made of only metal atom and oxygen atom such as aluminum oxide or magnesium oxide. However, in the salt coating in the present invention, the metal oxide such as described above may be contained.

Further, a mass of the salt coating is preferably at the rate of not higher than 2.0% by mass relative to the mass of the particles of negative electrode material. When the rate is not higher than 2.0% by mass, an increase in the resistance of the negative electrode may be suppressed, because there is no fear that the salt coating may disturb the exchange of the lithium.

Further, in the present invention, the particles of silicon-based active material preferably have an atomic ratio of C calculated from a peak of C1s and an atomic ratio of O calculated from a peak of O1s larger than atomic ratios of elements other than these in atomic ratios calculated from peaks appeared in a spectrum in the range of a binding energy of from 0 eV to 1300 eV measured by a survey scanning of X-ray photoelectron spectrometry (XPS).

When the atomic ratios of C and O calculated from peaks of a spectrum measured by the XPS are larger than other atomic ratios of other than these, it can be said that the carbon coating and the salt coating are present under well-balanced state on a surface of the particles of silicon-based active material. That is, in the particles of silicon-based active material like this, high electric conductivity due to the carbon coating is effectively exhibited because the carbon coating of sufficient amount for obtaining the electric conductivity is formed, and, a rate of a part covered by the salt coating of a surface of the carbon coating does not become excessively large. Further, since the salt coating is also formed in a sufficient amount for obtaining high water resistance, the negative electrode active material having, in addition to having high electric conductivity, high water resistance is obtained.

Further, when a test cell formed of a negative electrode prepared by using a negative electrode active material obtained by mixing the negative electrode active material of the present invention and the carbon-based active material and a counter electrode lithium is charged/discharged, and a graph showing a relationship between a differential value dQ/dV obtained by differentiating a discharge capacity Q by a potential V of the negative electrode on the basis of the counter electrode lithium and the potential V is depicted, the potential V of the negative electrode during discharge of flowing a current such that the negative electrode active material desorbs the lithium preferably has a peak in the range of from 0.40 V to 0.55 V. Since the peak in a V-dQ/dV curve is similar to a peak of the silicon material and a discharge curve has a sharp rise-up on a higher potential side, when designing a battery, a capacity tends to be developed.

(Method for Producing Negative Electrode)

Subsequently, one example of a method for producing the negative electrode for non-aqueous electrolyte secondary batteries will be described.

First, the negative electrode material contained in the negative electrode is produced. The negative electrode material may be produced according to a method for producing the present invention as shown below. First, the particles of silicon oxide represented by $SiO_x$ ($0.5 \leq x \leq 1.6$) are prepared. Then, the carbon coating is formed on a surface of the particles of silicon oxide. Then, Li is inserted in the particles of silicon oxide to modify the particles of silicon oxide. Further, at this time, a part of Li inserted in the particles of silicon oxide may be desorbed. Still further, simultaneously at this time, a Li compound may be generated inside or on a surface of the particles of silicon oxide.

Next, on at least a part of a surface of the particles of silicon oxide after modification or a surface of the carbon coating or both of these, the salt coating containing one or more kinds of the metal silicate containing the metal element other than the lithium element and the metal salt containing the metal element other than the lithium element is formed. Then, by using the particles of silicon oxide like this as the particles of negative electrode active material, and by mixing the conductive assistant or the binder or the like, a negative electrode material and a negative electrode may be produced.

More specifically, the negative electrode material is produced according to, for example, the following procedure.

First, a raw material that generates a silicon oxide gas is heated in the temperature range of from 900° C. to 1600° C. under the presence of an inert gas or under reduced pressure to generate a silicon oxide gas. In this case, the raw material is a mixture of a metallic silicon powder and a silicon dioxide powder, and, when considering the presence of surface oxygen of the metallic silicon powder and a slight amount of oxygen in a reaction furnace, a mixing mole ratio is desirable to be in the range of 0.8<metallic silicon powder/silicon dioxide powder<1.3. Silicon crystallites in the particle are controlled by a change of a charge range or a vaporization temperature, or by a heat treatment after generation. The generated gas is deposited on an absorption plate. The deposit is taken out in a state where a temperature in the reaction furnace is lowered to not higher than 100° C. followed by pulverizing and powderizing using a ball mill or a jet mill.

Next, a carbon coating is formed on a superficial layer of the obtained powder material (particles of silicon oxide). The carbon coating is effective for improving the battery characteristics of the negative electrode active material.

As a method for forming the carbon coating on the superficial layer of the powder material, a thermal decomposition CVD method is desirable. In the thermal decomposition CVD method, the powder material is set in the furnace, a hydrocarbon gas is filled in the furnace followed by elevating an inner furnace temperature. The decomposition temperature is not particularly limited but is particularly desirably not higher than 1200° C. More desirably is not higher than 950° C., and unintended disproportionation of the silicon oxide may be suppressed. The hydrocarbon gas is not particularly limited but desirably 3≥n in a $C_nH_m$ composition. This is because the production cost is low and the physical properties of a decomposition product are excellent.

Next, a bulk interior of the powder material will be modified. The modification of a bulk interior may be performed by using a device capable of electrochemically inserting and desorbing Li. A device structure is not particularly limited but the modification of the bulk interior may be performed by using, for example, a bulk interior modifier 20 shown in, for example, FIG. 2. The bulk interior modifier 20 includes a bath 27 filled with an organic solvent 23, a positive electrode (lithium source, modification source) 21 arranged in the bath 27 and connected to one of a power source 26, a powder housing container 25 arranged in the bath 27 and connected to the other of the power source 26, and a separator 24 provided between the positive electrode 21 and the powder housing container 25. The powder housing container 25 houses the particles of silicon oxide 22. Then, in the powder housing container, the particles of silicon oxide are housed, and a voltage is applied by the power source to the powder housing container in which the particles of silicon oxide are housed and a positive electrode (lithium source). Thus, since lithium may be inserted to or desorbed from the particles of silicon oxide, the powder 22 of silicon oxide may be modified.

As the organic solvent 23 in the bath 27, ethylene carbonate, propylene carbonate, dimethyl carbonate, diethyl carbonate, ethylmethyl carbonate, fluoromethyl methyl carbonate, and difluoromethyl methyl carbonate may be used. Further, as an electrolyte salt contained in the organic solvent 23, lithium hexafluorophosphate ($LiPF_6$), lithium tetrafluoroborate ($LiBF_4$) and the like may be used.

As the positive electrode 21, a Li foil may be used, or a Li-containing compound may be used. As the Li-containing compound, Li carbonate, Li oxide, lithium cobaltite, olivine lithium iron phosphate, lithium nickel oxide, vanadium lithium phosphate or the like may be used.

Further, the modification of the particles of silicon oxide due to the insertion or desorption of the lithium may be performed by using the thermal doping. In this case, the particles of silicon oxide may be modified by heating under a non-oxidizing atmosphere after mixing, for example, with a LiH powder or a Li powder. As the non-oxidizing atmosphere, for example, an Ar atmosphere or the like may be used. More specifically, first, under the Ar atmosphere, the LiH powder or Li powder is thoroughly mixed with the particles of silicon oxide, followed by sealing, further followed by agitating the sealed container as a whole to homogenize. Thereafter, the mixture is heated in the range of from 700° C. to 750° C. to modify. Further, in this case, in order to desorb a part of Li from the particles of silicon oxide, a method of sufficiently cooling the powder after heating, followed by cleansing with alcohol, alkali water in which lithium carbonate is dissolved, weak acid, or pure water may be used.

Further, the modification of the particles of silicon oxide due to the insertion and desorption of the lithium may be performed by the redox reaction in a solution by soaking the particles of silicon oxide in the solution. In this case, the lithium may be inserted by soaking the particles of silicon oxide in a solution A in which the lithium is dissolved in, for example, an ether solvent. In the solution A, a polycyclic aromatic compound may be further contained. After the insertion of Li, an active lithium may be desorbed from the particles of silicon oxide by soaking the particles of silicon oxide in a solution B containing the polycyclic aromatic compound or a derivative thereof. As a solvent of the solution B, for example, an ether-based solvent, a ketone-based solvent, an ester-based solvent, an alcohol-based solvent, an amine-based solvent, or a mixed solvent thereof may be used. Further, after soaking in the solution B, by soaking the particles of silicon oxide in a solution C containing an alcohol-based solvent, a carboxylic acid-based solvent, water, or a mixed solvent thereof, a larger amount of the active lithium may be desorbed from the particles of silicon oxide. Further, in place of the solution C, a solution C' that contains a compound having a quinoid structure in a molecule as a solute and contains an ether-based solvent, a ketone-based solvent, an ester-based solvent, or a mixed solvent thereof as a solvent may be used. Still further, soaking of the particles of silicon oxide to the solvents B, C and C' may be repeatedly applied. Thus, after the insertion of the lithium, by desorbing the active lithium, the negative electrode active material having higher water resistance may be obtained.

Subsequently, the salt coating containing one or more kinds of a metal silicate containing the metal element other than the lithium element and a metal salt containing the metal element other than the lithium element is formed on at least a part of the surface of the particles of silicon oxide after modification or the surface of the carbon coating or both of these. For example, the salt coating may be formed according to the following method. That is, by mixing the particles of silicon oxide in a liquid in which a hydrate of a metal salt is dispersed in ethanol, the salt coating may be formed. At this time, a part of lithium silicate contained in the particles of silicon oxide and a metal salt react to generate a metal silicate. Further, since the reaction proceeds according to a state of the lithium silicate contained in the particles of silicon oxide, there may be a case where, without all of the metal salt reacting completely, a partial reaction occurs. In this case, also the lithium silicate and unreacted metal salt remain on at least a part of a surface of the particles of silicon oxide or a surface of the carbon coating or both of these. Further, there is a case where the reaction does not proceed, and a salt coating that contains the metal salt but does not contain the metal silicate is formed. Thus, the salt coating may be formed. More specifically, the salt coating may be formed according to, for example, the following procedure.

First, ethanol, modified particles of silicon oxide having a mass of one fourth of a mass of the ethanol, and aluminum perchlorate equivalent to 2.0% by mass of the modified particles of silicon oxide are charged into a vessel, followed by agitating for 3 and half hours. At this time, it is possible to control a reaction with the active material by controlling an agitating time and a solution temperature. After the agitation, ethanol is removed by suction filtering, followed by drying the particles of silicon oxide at 100° C. under vacuum for 12 hours. At this time, a mass of the salt coating may be controlled by changing a mass of aluminum perchlorate added simultaneously with a modifier. At this time, as a material that is dissolved in ethanol, other than aluminum perchlorate, aluminum chloride, magnesium nitrate, magnesium acetate, and aluminum nitrate may be used.

Subsequently, the particles of silicon-based active material containing the particles of silicon oxide having the salt coating and, as needs arise, the carbon-base active material are mixed. Then, after forming a negative electrode mixture by mixing these negative electrode active material and a binder, and other materials such as a conductive assistant or the like, an organic solvent or water is added to form a slurry.

Next, as shown in FIG. 1, on a surface of the negative electrode current collector 11, the slurry of the negative electrode mixture is applied and dried to form the negative electrode active material layer 12. At this time, as needs arise, the hot pressing or the like may be applied. As was described above, the negative electrode for the non-aqueous electrolyte secondary batteries of the present invention may be produced.

2. Lithium Ion Secondary Battery

According to the method for producing the non-aqueous electrolyte secondary battery of the present invention, a non-aqueous electrolyte secondary battery is produced by using the negative electrode material produced according to the method for producing the negative electrode material. Hereinafter, the method for producing the non-aqueous electrolyte secondary battery of the present invention will be described with reference to a case of producing a laminate film type secondary battery.

(Configuration of Laminate Film Type Secondary Battery)

A laminate film type lithium ion secondary battery 30 shown in FIG. 3 houses a wound electrode body 31 mainly inside of a sheet-like exterior member 35. The wound electrode body 31 has a separator between a positive electrode and a negative electrode and is wound. Further, there is a case where the positive electrode and the negative electrode have a separator therebetween and house a laminate body. In either of electrode bodies, a positive electrode lead 32 is attached to the positive electrode, and a negative electrode lead 33 is attached to the negative electrode. An outermost periphery part of the electrode body is protected by a protective tape.

The positive and negative electrode leads 32 and 33 are led in one direction, for example, from an inside toward an outside of the exterior member 35. The positive electrode lead 32 is formed of a conductive material such as, for example, aluminum or the like, and the negative electrode lead 33 is formed of a conductive material such as, for example, nickel, copper or the like.

The exterior member 35 is a laminate film in which, for example, a fusion layer, a metal layer, and a surface protective layer are laminated in this order, and, in the laminate film, outer peripheral parts in the fusion layer of two sheets of film are fused, or, are stuck by an adhesive such that the fusion layer faces the electrode body 31. The fusion part is a film such as, for example, polyethylene or polypropylene, and the metal part is an aluminum foil. The protective layer is, for example, nylon or the like.

An adhesive film 34 is inserted between the exterior member 35 and the positive and negative electrode leads to prevent outer air from intruding. The material is, for example, a polyethylene, polypropylene, or polyolefin resin.

The positive electrode has, in the same manner as the negative electrode 10 of, for example, FIG. 1, a positive electrode active material layer on both sides or on one side of a positive electrode current collector.

The positive electrode current collector is formed of a conductive material such as, for example, aluminum or the like.

The positive electrode active material layer contains any one or more kinds of the positive electrode materials capable of absorbing/releasing lithium ion, and, may contain other materials such as a positive electrode binder, a positive electrode conductive assistant, a dispersant or the like according to a design. In this case, details of the positive electrode binder and the positive electrode conductive assistant are the same as, for example, the negative electrode binder and the negative electrode conductive assistant described above.

As the positive electrode material, a Li-containing compound is desirable. As the Li-containing compound, a composite oxide made of, for example, lithium and a transition metal element, or a phosphate compound having Li and the transition metal element may be used. Among these positive electrode materials, compounds containing at least one or more kinds of nickel, iron, manganese, and cobalt are preferred. Chemical formulas for these are represented by, for example, $Li_xM_1O_2$ or $Li_yM_2PO_4$. In the formulas, $M_1$ and $M_2$ represent at least one or more kinds of the transition metal elements. Values of x and y show different values depending on a battery charge/discharge state, but, are generally shown by $0.5 \leq x \leq 1.10$ and $0.05 \leq y \leq 1.10$.

As the composite oxide having lithium and the transition metal element, for example, a lithium-cobalt composite oxide ($Li_xCoO_2$), a lithium-nickel composite oxide ($Li_xNiO_2$), a lithium-nickel-cobalt composite oxide or the like may be used. As the lithium-nickel-cobalt composite oxide, for example, a lithium-nickel-cobalt-aluminum composite oxide (NCA), a lithium-nickel-cobalt-manganese composite oxide (NCM) or the like may be used.

As the phosphate compound having lithium and the transition metal element, for example, a lithium-iron phosphate compound ($LiFePO_4$), a lithium-iron-manganese phosphate compound ($LiFe_{1-u}Mn_uPO_4$ ($0<u<1$)) or the like may be used. When these positive electrode materials are used, high battery capacity may be obtained and excellent cycle characteristics may be also obtained.

(Negative Electrode)

The negative electrode has the same configuration as the negative electrode for a lithium ion secondary battery 10 of above FIG. 1 and has the negative electrode active material layer, for example, on both sides of the current collector. The negative electrode preferably has a negative electrode charging capacity larger than an electric capacity (charging capacity as a battery) obtained from the positive electrode active material agent. Thus, the lithium metal may be suppressed from depositing on the negative electrode.

The positive electrode active material layer is provided on a part of both sides of the positive electrode current collector, and in the similar manner, the negative electrode active material layer is also provided on a part of both sides of the negative electrode current collector. In this case, the negative electrode active material layer provided, for example, on the negative electrode current collector is provided on a region where an opposing positive electrode active material layer is not present. This is because stable battery design is performed.

A region where the negative electrode active material layer and the positive electrode active material layer do not face is hardly influenced by the charging/discharging. Therefore, a state of the negative electrode active material layer is maintained just as immediately after the formation, thereby a composition of the negative electrode active material or the like may be accurately investigated with excellent reproducibility irrespective of the presence or non-presence of the charging/discharging.

(Separator)

The separator separates the positive electrode and the negative electrode and allows passage of the lithium ion while preventing short circuit accompanying contact of both electrodes. The separator is formed of a porous film made of, for example, a synthetic resin, or ceramic. Further, the separator may have laminate structure in which two or more kinds of porous films are laminated. As the synthetic resin, for example, polytetrafluoroethylene, polypropylene, polyethylene or the like may be used.

(Electrolytic Solution)

At least a part of the active material layer or the separator is impregnated with a liquid electrolyte (electrolytic solution). The electrolytic solution has the electrolyte salt dissolved in the solvent and may contain other materials such as an additive or the like.

As the solvent, for example, a non-aqueous solvent may be used. As the non-aqueous solvent, for example, ethylene carbonate, propylene carbonate, butylene carbonate, dimethyl carbonate, diethyl carbonate, ethyl methyl carbonate, methyl propyl carbonate, 1,2-dimethoxy ethane, tetrahydrofuran or the like may be used. It is desirable to use at least one or more kinds among ethylene carbonate, propylene carbonate, dimethyl carbonate, diethyl carbonate, and ethyl methyl carbonate. This is because more excellent characteristics may be obtained. Further, in this case, more excellent characteristics may be obtained by combining a high viscosity solvent such as ethylene carbonate, propylene carbonate or the like and a low viscosity solvent such as dimethyl carbonate, ethyl methyl carbonate, diethyl carbonate or the like. This is because dissociability or ionic mobility of the electrolyte salt is improved.

It is preferable to contain an unsaturated carbon bond cyclic carbonic ester as a solvent additive. This is because a stable coating is formed on a surface of the negative electrode during discharging and the electrolytic solution is suppressed from decomposing. As the unsaturated carbon bond cyclic carbonic ester, for example, vinylene carbonate, vinyl ethylene carbonate or the like may be used.

Further, the solvent additive is preferable to contain a sultone (cyclic sulfonic acid ester). This is because the chemical stability of the battery is improved. As the sultone, for example, propane sultone and propene sultone may be used.

Further, the solvent preferably contains an acid anhydride. This is because the chemical stability of the electrolytic solution is improved. As the acid anhydride, for example, propane disulfonic acid anhydride may be used.

The electrolyte salt may contain any one or more kinds of light metal salts such as, for example, lithium salts. As the lithium salt, for example, lithium hexafluorophosphate ($LiPF_6$), lithium tetrafluoroborate ($LiBF_4$) or the like may be used.

A content of the electrolyte salt is preferably not smaller than 0.5 mol/kg and not larger than 2.5 mol/kg relative to the solvent. This is because high ionic conductivity is obtained.

(Method for Producing Laminate Film Type Secondary Battery)

At the beginning, a positive electrode is prepared by using the positive electrode material. First, after forming a positive electrode mixture by mixing the positive electrode active material and, as needs arise, a positive electrode binding agent, a positive electrode conductive assistant or the like, followed by dispersing in the organic solvent to form a positive electrode mixture slurry. Subsequently, the mixture slurry is applied on the positive electrode current collector by a coating device such as a knife roll or a die coater with a die head and dried by hot air to obtain a positive electrode active material layer. At the end, the positive electrode active material layer is compression molded by a roll press machine or the like. At this time, heating may be applied, and the compression may be repeated a plurality of times.

Next, by using the same operation procedure as the preparation of the negative electrode for lithium ion secondary batteries 10, the negative electrode active material layer is formed on the negative electrode current collector to form a negative electrode.

When preparing the positive electrode and the negative electrode, on both sides of the positive electrode and negative electrode current collectors, the respective active material layers are formed. At this time, in any of the electrodes, active material coating lengths on the both side parts may be displaced (see FIG. 1 below).

Subsequently, the electrolytic solution is prepared. Subsequently, by using ultrasonic welding or the like, the positive electrode lead 32 is attached to the positive electrode current collector and the negative electrode lead 33 is attached to the negative electrode current collector (see FIG. 3). Then, the positive electrode and the negative electrode are laminated via the separator, or wound to prepare a winding electrode body 31, followed by adhering a protective tape to the outermost peripheral part thereof. Next, the wound body is molded to be a flat shape. Then, after inserting the wound electrode body between folded film-like exterior member 35, insulation parts of the exterior member are adhered by a thermal fusion method, and with only one direction opened, the wound electrode body is encapsulated. Then, an adhesive film is inserted between the positive electrode lead, and the negative electrode lead and the exterior member. Subsequently, a predetermined amount of the prepared electrolytic solution is charged from a releasing part, followed by vacuum impregnation. After the impregnation, the releasing part is adhered by a vacuum thermal fusion method. As was described above, the laminate film type secondary battery 30 is produced.

In the non-aqueous electrolyte secondary battery of the present invention such as the prepared laminate film type secondary battery 30 or the like, a negative electrode utilization rate during charging/discharging is preferably not lower than 93% and not higher than 99%. When the negative electrode utilization rate is set in the range of not lower than 93%, the initial charging efficiency does not degrade, and the battery capacity may be largely improved. Further, when the negative electrode utilization efficiency is set in the range of not higher than 99%, safety may be secured without precipitating Li.

EXAMPLE

In what follows, the present invention will be more specifically described with reference to examples and comparative examples of the present invention. However, the present invention is not limited to these examples.

Example 1-1

According to the following procedure, the laminate film type secondary battery 30 shown in FIG. 3 was prepared.

At the beginning, a positive electrode was prepared. A positive electrode mixture was prepared by mixing 95 parts by mass of lithium-nickel-cobalt-aluminum composite oxide (LiNi$_{0.7}$Co$_{0.25}$Al$_{0.05}$O), 25 parts by mass of a positive electrode conductive assistant (acetylene black), and 2.5 parts by mass of a positive electrode binder (polyvinylidene fluoride, PVDF). Subsequently, the positive electrode mixture was dispersed in an organic solvent (N-methyl-2-pyrrolidone, NMP) to form a paste-like slurry. Next, the slurry was applied on both sides of a positive electrode current collector by a coating device having a die head, followed by drying with a hot air drier. At this time, the positive electrode current collector having a thickness of 15 μm was used. At the end, compression molding was applied with a roll press.

Then, a negative electrode was prepared. First, a silicon-based active material was prepared as shown below. A raw material (vaporization starting material) in which metallic silicon and silicon dioxide are mixed was set in a reaction furnace, what was vaporized in an atmosphere a degree of vacuum of which is 10 Pa was deposited on an absorption plate, after sufficiently cooling, a deposit was taken out and pulverized by a ball mill to obtain particles of silicon oxide (silicon compound). After adjusting particle sizes of the particles of silicon oxide, a carbon coating was coated by performing thermal CVD.

Subsequently, the particles of silicon oxide coated with the carbon coating and a LiH powder of a mass corresponding to 4% by mass of the particles of silicon oxide were mixed under an Ar atmosphere, followed by agitating with a shaker. After that, by heat-treating the agitated powder at 740° C. in an atmosphere-controlled furnace, lithium was inserted into the particles of silicon oxide to modify.

Next, the particles of silicon oxide after modification were charged into a mixed solution of ethanol and aluminum perchlorate, agitated, filtered and dried to remove ethanol. Thus, a salt coating containing aluminum perchlorate was formed on a surface of the particles of silicon oxide and on a surface of the carbon coating. Thus, particles of silicon-based active material made of the particles of silicon oxide having the carbon coating and the salt coating on the surface were prepared.

Subsequently, the particles of silicon-based active material and the carbon-based active material were blended at the mass ratio of 1:9 to prepare a negative electrode active material. Here, as the carbon-based active material, what was obtained by mixing natural graphite covered with a pitch layer and artificial graphite were mixed at the mass ratio of 5:5 was used. Further, a median diameter of the carbon-based active material was 20 μm.

Next, the prepared negative electrode active material, a conductive assistant 1 (carbon nanotube, CNT), a conductive assistant 2 (carbon fine particles having a median diameter of about 50 nm), a styrene-butadiene rubber (styrene-butadiene copolymer, hereinafter referred to as SBR) and carboxymethylcellulose (hereinafter, referred to as CMC) were mixed at a dry mass ratio of 92.5:1:1:2.5:3, followed by diluting with pure water to prepare a negative electrode mixture slurry. It is to be noted that the SBR and CMC are a negative electrode binder (negative electrode binding agent). Here, in order to measure the stability of the negative electrode mixture slurry, 30 g of a part of the prepared negative electrode mixture slurry was taken out separately from one for preparation of a secondary battery and stored at 20° C., and, gas generation states at after 6 hours, 24 hours, 48 hours, 72 hours, and one week from after preparation of the negative electrode mixture slurry and a sedimentation state after 48 hours were confirmed.

Further, as the negative electrode current collector, an electrolytic copper foil (thickness: 15 μm) was used. At the end, the negative electrode mixture slurry was applied on the negative electrode current collector, followed by drying under condition of 100° C.×1 hour in a vacuum atmosphere. After drying, a deposition amount (called also as area density) of the negative electrode active material layer a unit area on one side of the negative electrode was 5 mg/cm$^2$.

Next, after mixing fluoroethylene carbonate (FEC), ethylene carbonate (EC) and diethyl carbonate (DEC) as a solvent, the electrolyte salt (lithium hexafluorophosphate: LiPF$_6$) was dissolved to prepare an electrolytic solution. In this case, a composition of the solvent is set to FEC/EC/DEC=1/2/7 by a volume ratio, and a content of the electrolyte salt was set to 1.0 mol/kg to the solvent. Further, 1.5% by mass of vinylene carbonate (VC) was added to the obtained electrolytic solution.

Next, a secondary battery was assembled as shown below. At the beginning, an aluminum lead was ultrasonic welded to one end of the positive electrode current collector and a nickel lead was welded to the negative electrode current collector. Subsequently, the positive electrode, the separator, the negative electrode and the separator were laminated in this order and wound in the longitudinal direction to obtain a wound electrode body. A winding end part thereof was fixed by a PET protective tape. As the separator, a laminate film of 12 μm obtained by sandwiching a film having porous polyethylene as a main component with a film having porous polypropylene as a main component was used. Subsequently, after sandwiching the electrode body between the exterior members, outer periphery parts excluding one side were sealed by a thermal fusion method to house the electrode body inside. As the exterior member, an aluminum laminated film obtained by laminating a nylon film, an aluminum foil, and a polypropylene film was used. Subsequently, the prepared electrolytic solution was charged from an opening part and impregnated under vacuum atmosphere, followed by sealing by the thermal fusion method.

The cycle characteristics of the secondary battery prepared as shown above were evaluated.

The cycle characteristics were investigated as shown below. At the beginning, two cycles of charging/discharging were carried out at 0.2 C under the atmosphere of 25° C. for stabilizing the battery and a discharging capacity at the 2$^{nd}$ cycle was measured. Subsequently, the charging/discharging was repeated until a total cycle number becomes 499 cycles, and the discharging capacity was measured in each case. At the end, a capacity retention rate (hereinafter, simply referred to as "retention rate") was calculated by dividing the discharging capacity at the 500th cycles obtained by charging/discharging of 0.2 C by the discharging capacity at the 2$^{nd}$ cycle. During normal cycle, that is, from 3$^{rd}$ cycle to 499$^{th}$ cycle, the charging/discharging of charging of 0.7 C and discharging of 0.5 C were performed.

Further, as shown below, an initial efficiency of the silicon-based active material alone (SiO$_x$ alone) was calculated. First, the prepared silicon-based active material and polyacrylic acid were mixed at a mass ratio of 85/15 and this mixture was applied on a copper foil. At this time, an area density of the mixture applied at this time was about 2 mg/cm². Thereafter, after vacuum drying at 90° C. for 1 hour, in a coin battery shape of 2032 size, with a Li counter electrode, a constant current and constant voltage charging was started at a voltage of 0 V and at a current density of 0.2 mA/cm². Then, at the time point when a current value reached 0.1 mA, the constant current and constant voltage charging was stopped. Subsequently, a constant current discharging was performed and the discharging was stopped at the time pint when the voltage became 1.2 V. A current density during discharging was set to the same value as the charging. At this time, when a condition of inputting the Li to the negative electrode is taken as the charging, and a condition of extracting the Li from the negative electrode is taken as the discharging, the initial efficiency of the silicon-based active material alone ($SiO_x$ alone) becomes (discharging capacity)/(charging capacity)×100(%). By using this formula, the initial efficiency of the $SiO_x$ alone was calculated.

Examples 1-2 to Examples 1-10

Secondary batteries were prepared and the cycle characteristics were evaluated in the same procedure as in Example 1-1, except that compositions of the salt coating were altered as shown in Table 1, that is, except that kinds of the metal silicate and the metal salt contained in the salt coating were altered as shown in Table 1. Further, according to the same procedure as in Example 1-1, the initial efficiencies of the silicon-based active materials alone were calculated. The composition of the salt coating was altered by adjusting the kind of the metal salt dissolved in ethanol, a stirring time, and a temperature of a solution.

Comparative Example 1-1

The cycle characteristics of the secondary battery were evaluated, and the initial efficiency of the silicon-based active material alone was calculated in the same procedure as in Example 1-1, except that the insertion of lithium to the particles of silicon oxide, the formation of the carbon coating, and the formation of the salt coating were not applied.

Comparative Example 1-2

The cycle characteristics of the secondary battery were evaluated and the initial efficiency of the silicon-based active material alone was calculated in the same procedure as in Example 1-1, except that the insertion of lithium to the particles of silicon oxide and the formation of the salt coating were not applied.

Comparative Example 1-3

The cycle characteristics of the secondary battery were evaluated and the initial efficiency of the silicon-based active material alone was calculated in the same procedure as in Example 1-1, except that the formation of the salt coating was not applied.

The physical properties of the silicon compounds in the Examples and Comparative Examples are as shown below. In all of the Examples and Comparative Examples, a value of x of the silicon compound represented by $SiO_x$ was 1.0, and the median diameter $D_{50}$ of the silicon compound was 4 μm. Further, a half-value width (2θ) of a diffraction peak due to a Si(111) crystal plane obtained by X-ray diffractometry of an unmodified silicon compound such as Comparative Example 1-1 and Comparative Example 1-2 was 2.593°, and a crystallite size due to the Si(111) crystal plane was 3.29 nm. Still further, the half-value width (2θ) of the diffraction peak due to the Si(111) crystal plane obtained by X-ray diffractometry of a modified silicon compound in other than these Comparative Examples 1-1 and 1-2 was 1.2710, and the crystallite size due to the Si(111) crystal plane was 6.63 nm. This is because due to use of the thermal doping method for modification, the silicon compound was partially disproportionated and crystallization was forwarded. The modified silicon compound contained lithium silicate.

Further, in Examples 1-1 to 1-10 and Comparative Examples 1-2 and 1-3, the rate of the carbon coating was 5% by mass relative to a total of the silicon compound and the carbon coating. Still further, in the all Examples and Comparative Examples, as a chemical shift value obtained from a $^{29}$Si-MAS-NMR spectrum, a peak derived from a $SiO_2$ region provided in −95 to −150 ppm developed. Further, in Comparative Example 1-1 and Comparative Example 1-2, as a chemical shift value obtained from the $^{29}$Si-MAS-NMR spectrum, a relationship between a maximum intensity A of peaks derived from Si or $Li_2SiO_3$ provided between −60 to −94 ppm and an intensity B of a peak derived from the $SiO_2$ region was A<B. In other Examples and Comparative Examples, the relationship was A>B. The $^{29}$Si-MAS-NMR spectrum obtained in Examples 1-3 is shown in FIG. 4.

Further, in each of Examples 1-1 to 1-10, the salt coating was contained at the rate of 1.5% by mass relative to a mass of the particles of silicon-based active material.

Further, in each of Examples 1-1 to 1-10 and Comparative Example 1-1, the particles of silicon-based active material had the atomic ratio of C calculated from a peak of C1s and the atomic ratio of O calculated from a peak of O1s larger than the atomic ratios of other elements than these in the atomic ratios calculated from peaks appeared in a spectrum in the range of 0 eV to 1300 eV of the binding energy measured by a survey scanning of the X-ray photoelectron spectroscopy (XPS). It is to be noted that, in Comparative Examples 1-1 and 1-2, the atomic ratio of C was larger than the other atomic ratios but the atomic ratio of O was smaller than the atomic ratios of other than O.

Further, from the negative electrode prepared as was described above and the counter electrode lithium, a coin battery type test cell of a 2032 size was prepared, and the discharging behavior thereof was evaluated. In more specifically, first, at the counter electrode Li, a constant current and a constant voltage charging was performed up to 0 V, and, at the time point where the current density reached 0.05 mA/cm², the charging was stopped. After that, constant current discharging was performed up to 1.2 V. The current density at this time was 0.2 mA/cm². From the data obtained from charging/discharging like this, a graph was depicted with a capacity variation rate (dQ/dV) on a vertical axis and a voltage (V) on a horizontal axis, and whether the V may obtain a peak in the range of from 0.4 to 0.55 (V) was confirmed. As a result, in all Examples and Comparative Examples other than Comparative Examples 1-1 and 1-2, peaks were confirmed.

Evaluation results of Examples 1-1 to 1-10 and Comparative Examples 1-1 to 1-3 are shown in Table 1.

TABLE 1

SiOx x = 1, $D_{50}$ = 4 μm, SiOx ratio 10% by mass (relative to active material),
SiOx Intial Efficiency 0 V-1.2 V (vs Li)

| Table 1 | Composition of salt coating | Rate of salt coating (% by mass) | Li silicate | SiO Intial efficiency (%) | Carbon coating | dQ/dV peak | Half value width (2θ) (°) | Crystallite size (nm) | Modification method | A, B | Larger two kinds of a atomic ratios | Cycle retention rate (%) | Time up to gas generation | Sedimentation |
|---|---|---|---|---|---|---|---|---|---|---|---|---|---|---|
| Comparative Example 1-1 | — | — | No | 70 | No | No | 2.593 | 3.29 | Untreated | A < B | C | 68 | — | No |
| Comparative Example 1-2 | — | — | No | 70 | Yes | No | 2.593 | 3.29 | Untreated | A < B | C | 73 | — | No |
| Comparative Example 1-3 | — | — | Yes | 80 | Yes | Yes | 1.271 | 6.63 | Thermal Doping | A > B | C, O | 61 | 6 Hours | Yes |
| Example 1-1 | Aluminum perchlorate | 1.5 | Yes | 80 | Yes | Yes | 1.271 | 6.63 | Thermal Doping | A > B | C, O | 75 | 24 Hours | No |
| Example 1-2 | Aluminum perchlorate, aluminum silicate | 1.5 | Yes | 80 | Yes | Yes | 1.271 | 6.63 | Thermal doping | A > B | C, O | 78 | 48 Hours | No |
| Example 1-3 | Aluminum perchlorate, aluminum silicate lithium perchlorate | 1.5 | Yes | 80 | Yes | Yes | 1.271 | 6.63 | Thermal doping | A > B | C, O | 78 | 72 Hours | No |
| Example 1-4 | Aluminum perchlorate, lithium perchlorate | 1.5 | Yes | 80 | Yes | Yes | 1.271 | 6.63 | Thermal doping | A > B | C, O | 79 | 72 Hours | No |
| Example 1-5 | Aluminum perchlorate, lithium silicate, aluminum oxide | 1.5 | Yes | 80 | Yes | Yes | 1.271 | 6.63 | Thermal doping | A > B | C, O | 78 | 72 Hours | No |
| Example 1-6 | Aluminum silicate, lithium perchlorate | 1.5 | Yes | 80 | Yes | Yes | 1.271 | 6.63 | Thermal doping | A > B | C, O | 78 | 72 hours | No |
| Example 1-7 | Aluminum chloride | 1.5 | Yes | 80 | Yes | Yes | 1.271 | 6.63 | Thermal doping | A > B | C, O | 72 | 24 Hours | No |
| Example 1-8 | Magnesium nitrate | 1.5 | Yes | 80 | Yes | Yes | 1.271 | 6.63 | Thermal doping | A > B | C, O | 73 | 24 Hours | No |
| Example 1-9 | Magnesium acetate | 1.5 | Yes | 80 | Yes | Yes | 1.271 | 6.63 | Thermal doping | A > B | C, O | 72 | 24 Hours | No |
| Example 1-10 | Aluminum nitrate | 1.5 | Yes | 80 | Yes | Yes | 1.271 | 6.63 | Thermal doping | A > B | C, O | 72 | 24 Hours | No |

As obvious from Table 1, in each of Example 1-1 to 1-10, since the lithium was inserted in the particles of silicon oxide to modify, the initial efficiencies of SiO alone became higher than Comparative Examples 1-1 and 1-2 that were not modified. Further, due to the formation of the carbon coating, the conductivity was improved and the battery characteristics were improved. Still further, since the water resistance was improved due to the salt coating, a time until gas generation from preparation of the negative electrode mixture became longer than the Comparative Examples 1-1 to 1-3, and, even after elapse of 48 hours, the negative electrode mixture slurry did not generate sedimentation. That is, the stability of the negative electrode mixture slurry was improved. Therefore, also the cycle retention rate became higher than Comparative Examples 1-1 to 1-3.

On the other hand, in Comparative Example 1-1, since the modification was not applied, the initial efficiency of the $SiO_x$ alone is low. Further, since the carbon coating was not formed, the electric resistance of the particles of silicon-based active material increased and the electrical contact with the carbon-based active material became insufficient, and the cycle characteristics were degraded.

In Comparative Example 1-2, since the carbon coating was formed, the conductivity was improved, and also the cycle characteristics were improved. However, since, in the same manner as Comparative Example 1-1, the particles of silicon oxide were not modified, the initial efficiency of the $SiO_x$ alone is low, and, when mixed with the carbon active material, high initial efficiency cannot be obtained. Therefore, in this case, an improvement in the battery capacity is not obtained.

Since the salt coating was not formed in Comparative Example 1-3, the water resistance of the modified particles of silicon oxide was low, and, within 6 hours from preparation of the negative electrode mixture slurry, gas was generated. Further, after 48 hours, partial sedimentation was confirmed. Thus, since the negative electrode mixture slurry is unstable, adhesiveness with the copper foil during applying becomes insufficient, and the cycle characteristics are degraded. Further, since a pot life of the negative electrode mixture slurry is insufficient, the negative electrode active material cannot respond to industrial production of the secondary batteries.

Examples 2-1 and 2-2, Comparative Examples 2-1 and 2-2

Secondary batteries were produced in the same manner as in Examples 1-3, except that an oxygen amount within bulk of the silicon compound was adjusted. In this case, a ratio of the vaporization starting material or a temperature was varied to adjust an oxygen amount. Values of x of the silicon compounds represented by SiOx in Examples 2-1 and 2-2 and Comparative Examples 2-1 and 2-2 are shown in Table 2.

Evaluation results of Examples 2-1 and 2-2 and Comparative Examples 2-1 and 2-2 are shown in Table 2.

TABLE 2

SiOx, $D_{50}$ = 4 µm, salt coating: aluminum perchlorate, aluminum silicate, lithium perchlorate 1.5% by mass
SiOx ratio 10% by mass (relative to active material), SiOx initial efficiency 80%, XPS atomic ratio two larger kinds C, O
Carbon coating 5% by mass, dQ/dV with peak, half-value width (2θ) 1.271°, crystallite 6.63 nm, modification method: thermal doping, A > B, with Li silicate

| | X | Cycle retention rate (%) | Time up to gas generation | Sedimentation |
|---|---|---|---|---|
| Comparative Example 2-1 | 0.3 | 59 | 24 hours | Yes |
| Example 2-1 | 0.5 | 71 | 48 hours | No |
| Example 1-3 | 1.0 | 78 | 72 hours | No |
| Example 2-2 | 1.6 | 77 | 72 hours | No |
| Comparative Example 2-2 | 1.8 | — | 72 hours | No |

When an oxygen amount in the silicon compound decreases, that is, when x<0.5, Si become rich, and the cycle retention rate was largely degraded. Further, in the case where oxygen is rich, that is, when x>1.6, the resistance of the silicon compound becomes higher, evaluation of battery is difficult, and the evaluation was stopped. Further, when the oxygen amount is low like in Comparative Example 2-1, it is considered that an abundance of Li silicate decreases during Li doping to result in instability of the bulk, and gas generation or sedimentation proceeded in the slurry.

Example 3-1 to 3-6

The cycle characteristics of the secondary batteries were evaluated and the initial efficiencies of the silicon-based active materials alone were calculated in the same procedure as in Example 1-3, except that the modification method of the particles of silicon oxide and the composition of the salt coating were altered as shown in Table 3.

In Examples 3-1 to 3-3, the electrochemical method was used. More specifically, first, the particles of silicon oxide after formation of the carbon coating were dispersed in carboxymethylcellulose to prepare a slurry. And, the slurry was pelletized and dried, and the particles of silicon oxide contained therein were modified by using the bulk interior modifier 20 shown in FIG. 2. As the organic solvent 23, a solution in which ethylene carbonate and dimethyl carbonate were mixed at the rate of 3:7 by volume ratio, further, LiBF$_4$ was added at a concentration of 1 mol/Kg was used. In the apparatus like this, by controlling a voltage, the Li was inserted and desorbed.

In Examples 3-4 to 3-6, the redox reaction was used to modify. More specifically, first, the particles of silicon oxide after formation of the carbon coating were soaked in a solution (solution A) in which a lithium piece and biphenyl were dissolved in tetrahydrofuran (hereinafter, referred to also as THF). The solution A was prepared by dissolving biphenyl in the THF solvent at the concentration of 1 mol/L, followed by adding the Li piece equivalent to mass of 10% by mass relative to a mixed liquid of the THF and biphenyl. Further, a temperature of the solution when soaking the powder of the silicon compound was set to 20° C., and the soaking time was set to 10 hours. After that, the powder of the silicon compound was filtered. Thus, lithium was inserted in the silicon compound.

Next, in a solution (solution B) in which naphthalene was dissolved in TFH, the powder of the silicon compound after lithium insertion was soaked. The solution B of Example 1-1 was prepared by dissolving naphthalene in the THF solvent at the concentration of 2 mol/L. Further, a temperature of the solution when the powder of the silicon compound is soaked was set to 20° C., and the soaking time was se to 20 hours. After that, the powder of the silicon compound was filtered. Thus, active lithium in the silicon compound was partially deactivated.

Then, the powder of the silicon compound after contact with the solution B was soaked in a solution (solution C') in which p-benzoquinone was dissolved in THF at the concentration of 1 mol/L. The soaking time was set to 2 hours. Next, by further agitating in an aqueous solution saturated with the lithium carbonate (solution C), the powder was filtered. Thus, the active lithium in the silicon compound was almost completely deactivated. Then, the silicon compound after cleansing treatment was dried under reduced pressure. As was shown above, the modification due to the redox reaction was performed.

Evaluation results of Examples 3-1 to 3-6 are shown in Table 3.

TABLE 3

SiOx, x = 1 $D_{50}$ = 4 μm, salt coating 1.5% by mass
SiOx ratio 10% by mass (relative to active material), SiOx initial
efficiency 80%, XPS atomic ratio larger two kinds C, O
carbon coating 5% by mass, dQ/dV with peak, half-value width (2θ)
2.593°, crystallite 3.29 nm,
A > B, with Li silicate

| | Modification Method | Composition of salt Coating | Cycle Retention Rate (%) | Time up to Gas Generation | Sedimentation |
|---|---|---|---|---|---|
| Example 3-1 | Electrochemical | Aluminum perchlorate | 81 | 48 hours | No |
| Example 3-2 | Electrochemical | Aluminum perchlorate, Aluminum silicate | 80 | 48 hours | No |
| Example 3-3 | Electrochemical | Aluminum perchlorate, Aluminum silicate, Lithium perchlorate | 81 | 48 hours | No |
| Example 3-4 | Redox | Aluminum perchlorate | 80 | 48 hours | No |
| Example 3-5 | Redox | Aluminum perchlorate, Aluminum silicate | 80 | 48 hours | No |
| Example 3-6 | Redox | Aluminum perchlorate, Aluminum silicate, Lithium perchlorate | 81 | 48 hours | No |

As shown in Table 3, even when the modification method is altered, in the same manner as in Examples 1-3 or the like, gas generation and sedimentation may be delayed, suppressed than Comparative Examples 1-3, and excellent cycle characteristics were obtained. Further, the $^{29}$Si-MAS-NMR spectrum obtained in Example 3-3 is shown in FIG. 5. In Example 3-3, since the modification due to the thermal doping was not performed, a spectrum different from the spectrum obtained in Example 1-3 of FIG. 4 was obtained. As shown in FIG. 5, in the range of the chemical shift of from −60 to −94 ppm, a peak derived from Si is seen in the neighborhood of −85 ppm and was a maximum peak intensity (maximum intensity A) in this range. Further, an intensity B of a peak derived from the $SiO_2$ region was found in the neighborhood of −115 ppm.

Example 4-1

The cycle characteristics of the secondary battery were evaluated and the initial efficiency of the silicon-based active material alone was calculated in the same procedure as in Example 3-3, except that the atomic ratio calculated from the peak appeared in the spectrum measured by a survey scan of X-ray photoelectron spectroscopy was altered.

The atomic ratio may be altered by controlling amounts of ethanol and the metal salt used during formation of the salt coating to the particles of silicon oxide, and a reaction time of the metal salt and the particles of silicon oxide. In Example 4-1, a mass of the metal salt to a mass of the particles of silicon oxide was adjusted.

Evaluation results of Example 4-1 are shown in Table 4.

TABLE 4

SiOx, $D_{50}$ = 4 μm, salt coating: aluminum perchlorate,
aluminum silicate, lithium perchlorate 1.5% by mass
SiOx ratio 10% by mass (relative to active material), SiOx initial
efficiency 80%,
Carbon coating 5% by mass, dQ/dV with peak, half-value width (2θ)
2.593°, crystallite 3.29 nm, modification method: electrochemical,
A > B, with Li silicate

| | Atomic ratio larger two kinds | Cycle Retention Rate (%) | Time up to Gas Generation | Sedimentation |
|---|---|---|---|---|
| Example 4-1 | O > F > C | 77 | 24 hours | No |
| Example 3-3 | O, C | 81 | 48 hours | No |

Like Example 3-3, when C and O are detected by larger amounts than other elements on a superficial layer of the particles of silicon oxide, it may be said that the carbon coating and the salt coating are coated with good balance. Therefore, due to high-quality coatings made of the carbon coating and salt coating, both high conductivity and high water resistance are provided. Therefore, the cycle characteristics may be improved, the gas generation may be suppressed, and the sedimentation may be suppressed.

On the other hand, when a part covered by a decomposition product of the organic solvent used in the electrochemical method or the like is relatively large on the superficial layer of the particles of silicon oxide, as shown in Example 4-1, F is detected in a larger amount than C like Example 4-1. It is to be noted that, in Example 4-1, peak intensities in the measured spectrum had a relationship of O1s>F1s>C1s. Compared with the case where C and O are detected more abundant than other elements like Example 3-3, the water resistance of lithium silicate generated inside of the particles of silicon oxide is slightly degraded.

Examples 5-1 to 5-5

The cycle characteristics of the secondary batteries were evaluated and the initial efficiencies of the silicon-based active materials alone were calculated in the same procedure as in Example 3-3, except that the rate of the salt coating in the silicon-based active material was altered as shown in Table 5. The rate of the salt coating may be altered by controlling amounts of ethanol and the metal salt used during formation of the salt coating to the particles of silicon oxide.

Evaluation results of Examples 5-1 to 5-5 are shown in Table 5.

TABLE 5

SiOx, x = 1 $D_{50}$ = 4 μm, salt coating: aluminum perchlorate, aluminum silicate, lithium perchlorate
SiOx ratio 10% by mass (relative to active material), SiOx initial efficiency 80%, XPS atomic ratio larger two kinds C, O
Carbon coating 5% by mass, dQ/dV with peak, half-value width (2θ) 2.593°, crystallite 3.29 nm, modification method: electrochemical, A > B, with Li silicate

| | Rate of Salt Coating (% by mass) | SiO Initial Efficiency (%) | Cycle Retention Rate (%) | Time up to Gas Generation | Sedimentation |
|---|---|---|---|---|---|
| Example 5-1 | 0.5 | 80 | 73 | 24 hours | No |
| Example 5-2 | 1.0 | 80 | 74 | 48 hours | No |
| Example 3-3 | 1.5 | 80 | 78 | 72 hours | No |
| Example 5-3 | 2.0 | 80 | 79 | 72 hours | No |
| Example 5-4 | 3.0 | 80 | 69 | 72 hours | No |
| Example 5-5 | 4.0 | 80 | 68 | 1 week | No |

As shown in Table 5, when the rate of the salt coating is not larger than 2.0% by mass, the surface resistance of the particles of silicon-based active material is suppressed from increasing, therefore the cycle characteristics may be improved. Further, also in this case, the gas generation and sedimentation could be more delayed and suppressed than the comparative example.

Examples 6-1 to 6-5

The cycle characteristics of the secondary batteries were evaluated and the initial efficiencies of the silicon-based active material alone were calculated in the same procedure as in Examples 1-3, except that the crystallinity of the silicon compound was altered. The alteration of the crystallinity of the silicon compound may be controlled by heat-treating after preparation of the silicon compound under a non-air atmosphere.

Examples 6-6 to 6-8

The cycle characteristics of the secondary batteries were evaluated and the initial efficiencies of the silicon-based active materials alone were calculated in the same procedure as in Example 3-3, except that the crystallinity of the silicon compound was altered. The alteration of the crystallinity of the silicon compound may be controlled by heat-treating after preparation of the silicon compound under a non-air atmosphere. It is to be noted that, in the modification due to the thermal doping like in Examples 6-1 to 6-5, heat is applied on the silicon compound more than a definite level. Therefore, in Examples 6-6 to 6-8, in materials closer to an amorphous state, in order to maintain low crystallinity, the electrochemical method is used to modify.

Evaluation results of Examples 6-1 to 6-8 are shown in Table 6.

TABLE 6

SiOx x = 1, $D_{50}$ = 4 μm, salt coating: aluminum perchlorate, aluminum silicate, lithium perchlorate 1.5% by mass
SiOx ratio 10% by mass (relative to active material), SiOx Intial efficiency 80%, XPS atomic ratio larger two kinds C, O carbon coating 5% by mass, dQ/dV with peak, A > B, with Li silicate

| Table 6 | Modification Method | Half-width Value (2θ) (°) | Crystallite Size (nm) | SiO Intial Efficiency (%) | Cycle Retention Rate (%) | Time up to Gas Generation | Sedimentation |
|---|---|---|---|---|---|---|---|
| Example 6-1 | Thermal doping | 0.756 | 11.42 | 80 | 68 | 72 hours | No |
| Example 6-2 | Thermal doping | 0.796 | 10.84 | 80 | 69 | 72 hours | No |
| Example 6-3 | Thermal doping | 1.025 | 8.55 | 80 | 75 | 72 hours | No |
| Example 6-4 | Thermal doping | 1.218 | 7.21 | 80 | 77 | 72 hours | No |
| Example 1-2 | Thermal doping | 1.271 | 6.63 | 80 | 78 | 72 hours | No |
| Example 6-5 | Thermal doping | 1.845 | 4.62 | 80 | 79 | 72 hours | No |
| Example 6-6 | Electro-chemical | 2.257 | 3.77 | 80 | 79 | 72 hours | No |
| Example 3-3 | Electro- | 2.593 | 3.29 | 80 | 81 | 72 hours | No |

TABLE 6-continued

SiOx x = 1, $D_{50}$ = 4 μm, salt coating: aluminum perchlorate,
aluminum silicate, lithium perchlorate 1.5% by mass
SiOx ratio 10% by mass (relative to active material), SiOx Intial efficiency
80%, XPS atomic ratio larger two kinds C, O carbon coating 5% by mass,
dQ/dV with peak, A > B, with Li silicate

| Table 6 | Modifi-cation Method | Half-width Value (2θ) (°) | Crystal-lite Size (nm) | SiO Initial Efficiency (%) | Cycle Retention Rate (%) | Time up to Gas Generation | Sedimen-tation |
|---|---|---|---|---|---|---|---|
| Example 6-7 | chemical Electro-chemical | 10.123 | 1.524 | 80 | 82 | 72 hours | No |
| Example 6-8 | Electro-chemical | 20.221 | 0 | 80 | 82 | 72 hours | No |

In particular, in low crystallinity materials having the half-value width (2θ) of not smaller than 1.2° and a crystallite size due to the Si (111) plane of not larger than 8.6 nm, a high retention rate was obtained.

Examples 7-1 to 7-6

The secondary batteries were produced in the same manner as in Examples 1-3, except that the median diameters of the silicon compounds were altered as shown in Table 7.

Evaluation results of Examples 7-1 to 7-6 are shown in Table 7.

TABLE 7

SiOx, x = 1, salt coating: aluminum perchlorate, aluminum silicate,
lithium perchlorate 1.5% by mass
SiOx ratio 10% by mass (relative to active material), SiOx initial
efficiency 80%, XPS atomic ratio larger two kinds C, O carbon coating
5% by mass,
dQ/dV with peak, half-value width (2θ) 1.271°, crystallite 6.63 nm,
modification method: thermal doping, A > B, with Li silicate

| | Medium Diameter $D_{50}$ (μm) | Cycle Retention Rate (%) | Time up to Gas Generation | Sedimentation |
|---|---|---|---|---|
| Example 7-1 | 0.1 | 73 | 24 hours | No |
| Example 7-2 | 0.5 | 75 | 48 hours | No |
| Example 7-3 | 1.0 | 77 | 72 hours | No |
| Example 7-4 | 10 | 79 | 72 hours | No |
| Example 7-5 | 15 | 77 | 72 hours | No |
| Example 7-6 | 20 | 72 | 72 hours | No |

When the median diameter of the silicon compound is not smaller than 0.5 μm, the retention rate was improved. This is considered that since the surface area of the silicon compound was not too large, an area where the side reaction occurs could be reduced. On the other hand, when the median diameter is not larger than 15 μm, since the particles are difficult to be broken during the charging and an SEI (solid electrolyte interface) due to a newly generated surface is difficult to occur during charging/discharging, loss of reversible Li may be suppressed.

It is to be noted that the present invention is not limited to the embodiments. The embodiments are only illustrative, all what has a configuration substantially the same as technical ideas described within the scope of appended claims of the present invention and has the similar action and effect is included in the technical range of the present invention.

The invention claimed is:

1. A negative electrode active material for non-aqueous electrolyte secondary batteries having particles of negative electrode active material, the particles of negative electrode active material containing a silicon compound $SiO_x$: 0.5≤x≤1.6 in which a Li compound is contained, including:
a carbon coating on at least a part of a surface of the silicon compound; and
a salt coating containing one or more kinds of a metal silicate containing a metal element other than a lithium element and a metal salt containing a metal element other than the lithium element on a part of a surface of the silicon compound or a surface of the carbon coating or both of these.

2. The negative electrode active material for non-aqueous electrolyte secondary batteries according to claim 1, wherein the metal silicate contains at least one or more kinds of elements of aluminum and magnesium.

3. The negative electrode active material for non-aqueous electrolyte secondary batteries according to claim 1, wherein the metal salt contains at least one or more kinds of elements of aluminum and magnesium.

4. The negative electrode active material for non-aqueous electrolyte secondary batteries according to claim 1, wherein the metal salt further contains also a lithium element.

5. The negative electrode active material for non-aqueous electrolyte secondary batteries according to claim 1, wherein the metal salt is a compound selected from a hydrochloride, a perchlorate, a nitrate, and an acetate.

6. The negative electrode active material for non-aqueous electrolyte secondary batteries according to claim 1, wherein the salt coating further contains a metal oxide.

7. The negative electrode active material for non-aqueous electrolyte secondary batteries according to claim 1, wherein the particles of negative electrode active material have an atomic ratio of C calculated from a peak of C1s and an atomic ratio of O calculated from a peak of O1s larger than atomic ratios of other elements than these in atomic ratios calculated from peaks appeared in a spectrum in the range of a binding energy of from 0 eV to 1300 eV measured by a survey scanning of X-ray photoelectron spectrometry.

8. The negative electrode active material for non-aqueous electrolyte secondary batteries according to claim 1, wherein a mass of the salt coating is at a rate of not higher than 2.0% by mass to a mass of the particles of negative electrode active material.

9. The negative electrode active material for non-aqueous electrolyte secondary batteries according to claim 1, wherein the silicon compound contains one or more kinds of $Li_2SiO_3$ or $Li_4SiO_4$ as the Li compound.

10. The negative electrode active material for non-aqueous electrolyte secondary batteries according to claim 1, wherein the silicon compound satisfies, as a chemical shift value obtained from a $^{29}Si$-MAS-NMR spectrum, a relationship of A>B between a maximum intensity A among peaks derived from Si or $Li_2SiO_3$ provided between −60 to −94 ppm and an intensity B of a peak derived from a $SiO_2$ region provided between −95 to −150 ppm.

11. The negative electrode active material for non-aqueous electrolyte secondary batteries according to claim 1, wherein when a test cell formed of a negative electrode prepared by using a negative electrode active material obtained by mixing the negative electrode active material for non-aqueous electrolyte secondary batteries and a carbon-based active material and a counter electrode lithium is charged/discharged, and a graph showing a relationship between a differential value dQ/dV obtained by differentiating a discharge capacity Q by a potential V of the negative electrode on the basis of the counter electrode lithium and the potential V is depicted, the potential V of the negative electrode during discharge of flowing a current such that the negative electrode active material for the non-aqueous electrolyte secondary battery desorbs lithium has a peak in the range of from 0.40 V to 0.55 V.

12. The negative electrode active material for non-aqueous electrolyte secondary batteries according to claim 1, wherein the silicon compound has a half-value width (2θ) of a diffraction peak due to a Si (111) crystal plane obtained by X-ray diffractometry of not smaller than 1.0° and a crystallite size due to the crystal plane is not larger than 8.6 nm.

13. The negative electrode active material for non-aqueous electrolyte secondary batteries according to claim 1, wherein a median diameter of the silicon compound is not smaller than 0.5 μm and not larger than 15 μm.

14. A non-aqueous electrolyte secondary battery containing the negative electrode active material for non-aqueous electrolyte secondary batteries according to claim 1.

15. A method for producing a negative electrode material for non-aqueous electrolyte secondary batteries containing particles of negative electrode active material, including the steps of:
preparing particles of a silicon oxide represented by a general formula $SiO_x$ 0.5≤x≤1.6;
forming a carbon coating on at least a part of a surface of the particles of silicon oxide;
inserting Li in the particles of silicon oxide covered with the carbon coating to modify the particles of silicon oxide; and
forming a salt coating containing one or more kinds of a metal silicate containing a metal element other than a lithium element and a metal salt containing a metal element other than the lithium element on at least a part of a surface of the modified particles of silicon oxide or a surface of the above carbon coating or both of these,
the particles of silicon oxide on which the salt coating has been formed are used to produce the negative electrode material for non-aqueous electrolyte secondary battery.

16. A method for producing a non-aqueous electrolyte secondary battery, wherein a negative electrode material for non-aqueous electrolyte secondary batteries is produced according to the production method according to claim 15, and a non-aqueous electrolyte secondary battery is produced using the negative electrode material for non-aqueous electrolyte secondary battery.

* * * * *